(12) United States Patent
Xia et al.

(10) Patent No.: US 8,594,500 B2
(45) Date of Patent: Nov. 26, 2013

(54) CONNECTION LOSS SCHEME FOR FIBER CONNECTIONS IN OPTICAL COMMUNICATION SYSTEM

(75) Inventors: Tiejun J. Xia, Richardson, TX (US);
 Glenn A. Wellbrock, Wylie, TX (US);
 Danny Peterson, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 419 days.

(21) Appl. No.: 12/623,648

(22) Filed: Nov. 23, 2009

(65) Prior Publication Data

US 2011/0123190 A1 May 26, 2011

(51) Int. Cl.
 *H04B 10/08* (2011.01)

(52) U.S. Cl.
 USPC ......... 398/38; 398/9; 398/25; 398/28; 398/37

(58) Field of Classification Search
 USPC ............................................ 398/9, 16, 25–38
 See application file for complete search history.

(56) References Cited

U.S. PATENT DOCUMENTS

| | | | | |
|---|---|---|---|---|
| 4,189,206 A | * | 2/1980 | Terai et al. ................... 385/20 |
| 4,564,933 A | * | 1/1986 | Hirst ............................ 714/713 |
| 5,754,284 A | * | 5/1998 | Leblanc et al. ............. 356/73.1 |
| 5,930,017 A | * | 7/1999 | Davis et al. ...................... 398/7 |
| 6,160,649 A | * | 12/2000 | Horiuchi et al. ............... 398/34 |
| 6,381,010 B1 | * | 4/2002 | Piffaretti ..................... 356/73.1 |
| 6,459,478 B1 | * | 10/2002 | Schmidt et al. ............ 356/73.1 |
| 6,583,867 B1 | * | 6/2003 | Jennings et al. ............ 356/73.1 |
| 6,590,642 B2 | * | 7/2003 | Iida .............................. 356/73.1 |
| 7,110,668 B2 | * | 9/2006 | Gerstel et al. ................... 398/5 |
| 7,365,902 B2 | * | 4/2008 | Isshiki ......................... 359/334 |
| 7,599,618 B2 | * | 10/2009 | Adam et al. ..................... 398/16 |
| 7,633,607 B2 | * | 12/2009 | Froggatt .................... 356/73.1 |
| 8,290,373 B2 | * | 10/2012 | Aono ............................ 398/135 |
| 2002/0015200 A1 | * | 2/2002 | Jennings et al. ........... 359/124 |
| 2004/0196532 A1 | * | 10/2004 | Evangelides et al. ........ 359/334 |
| 2004/0198340 A1 | * | 10/2004 | Lee et al. ...................... 455/423 |
| 2005/0249509 A1 | * | 11/2005 | Nagarajan et al. ........... 398/198 |
| 2006/0146318 A1 | * | 7/2006 | Adam et al. ............... 356/237.1 |
| 2007/0115456 A1 | * | 5/2007 | Wisseman .................. 356/73.1 |
| 2008/0144015 A1 | * | 6/2008 | Goto et al. .................. 356/73.1 |
| 2009/0202237 A1 | * | 8/2009 | Zhang et al. ...................... 398/6 |

\* cited by examiner

*Primary Examiner* — Nathan Curs
*Assistant Examiner* — Tanya Ngo

(57) ABSTRACT

A method includes outputting an optical signal from an optical transmitter; causing the optical signal to propagate through equipment of an optical communication site and to loop back to an optical receiver; measuring optical powers, respectively, based on taps proximate to the optical transmitter and the optical receiver; calculating an optical power loss based on the optical powers measured; determining whether the optical power loss is an acceptable value; and indicating when the optical power loss is not the acceptable value.

18 Claims, 6 Drawing Sheets

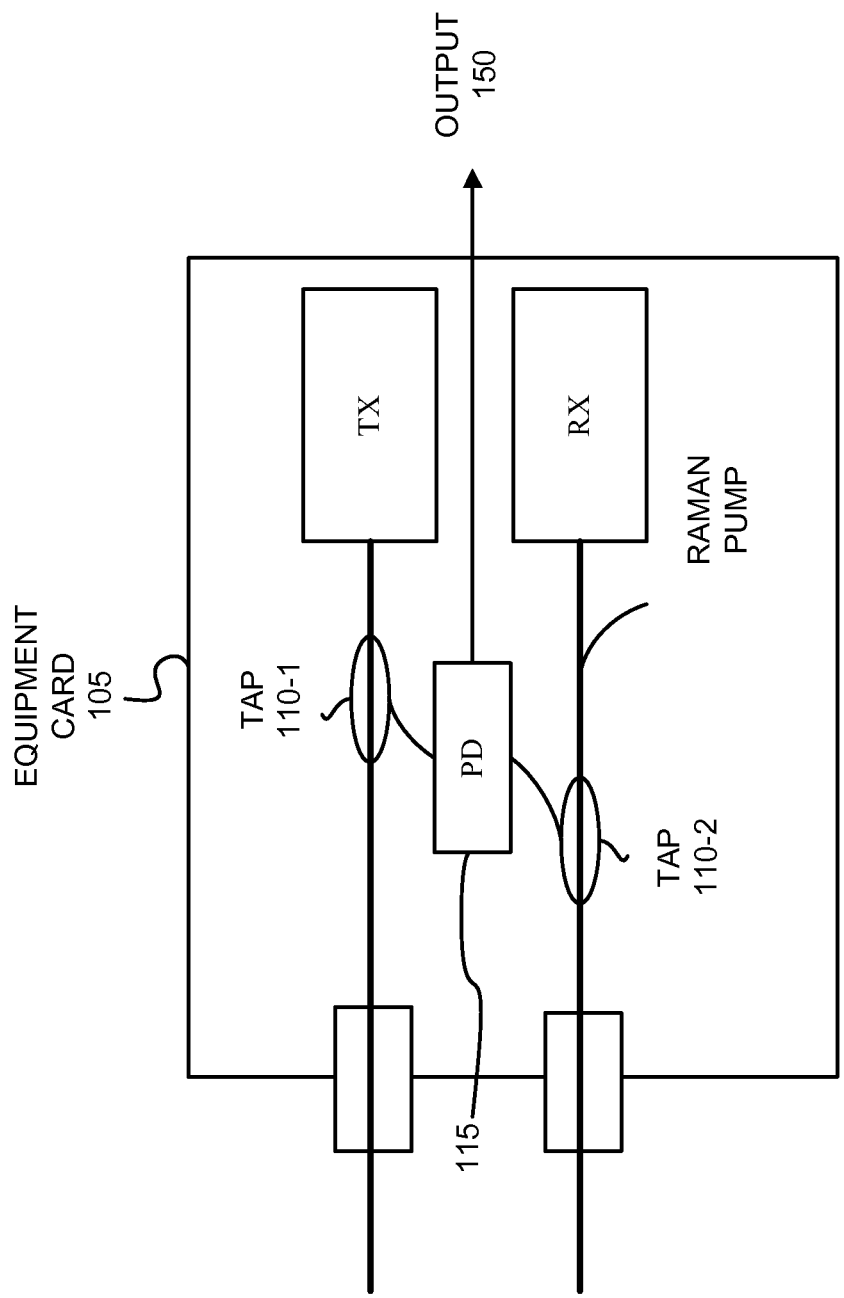

CONNECTION LOSS SCHEME FOR FIBER CONNECTIONS IN OPTICAL COMMUNICATION SYSTEM

BACKGROUND

The utilization of Raman amplification increases steadily in optical fiber communication for enhanced signal performance. However, Raman amplification may introduce high pumping power into outside plant (OSP) fiber. In addition, a high number of dense wavelength division multiplexing (DWDM) channels may increase the signal power in OSP fiber. When significant power is introduced, the power may pass through the connections between the equipment of a central office (CO) to the OSP fiber. Unfortunately, any dirt, dust, oil, or other contaminates at connector interfaces may cause damage to the connector interfaces and/or the equipment of the CO. Additionally, any dirt, dust, oil, etc., may cause abnormal signal loss between the equipment of the CO and the OSP fiber.

BRIEF DESCRIPTION OF THE DRAWINGS

FIGS. 1B-1D are block diagrams illustrating an exemplary process for permitting a power loss to be measured in the exemplary environment depicted in FIG. 1A;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

As will be described herein, exemplary embodiments may permit an optical power loss to be measured between an optical transmitter and an optical receiver associated with an optical fiber communication system (e.g., an optical communication site, such as a CO, or some other type of site or node). However, unlike existing approaches, the optical power loss may be measured after the optical transmitter and the optical receiver may be connected to an OSP fiber.

In an exemplary implementation, fiber taps may be installed proximate (i.e., in relatively close proximity) to the optical transmitter and the optical receiver. The fiber taps may be communicatively coupled to a photodetector. A fiber switch may be situated proximate (i.e., in relatively close proximity) to the OSP fiber such that there are no manual fiber connections beyond this point.

According to an exemplary process, the optical transmitter may be turned on and may output an optical signal. The fiber switch may receive the optical signal and cause the optical signal to loop back to the optical receiver. The fiber taps may permit the photodetector to measure optical power and/or optical power connection loss between the optical transmitter and the optical receiver. The optical power loss may be compared to an optical power loss threshold value or a range of optical power loss values to determine whether the optical power loss is an acceptable value. If the optical power loss is not an acceptable value, human intervention may take place. For example, optical fiber connectors and/or equipment between the optical transmitter and the optical receiver may be checked and cleaned. If the optical power loss is an acceptable value, the fiber switch may be set to permit transmission to the OSP fiber and a Raman pump may then be safely turned on.

Figure 1A:
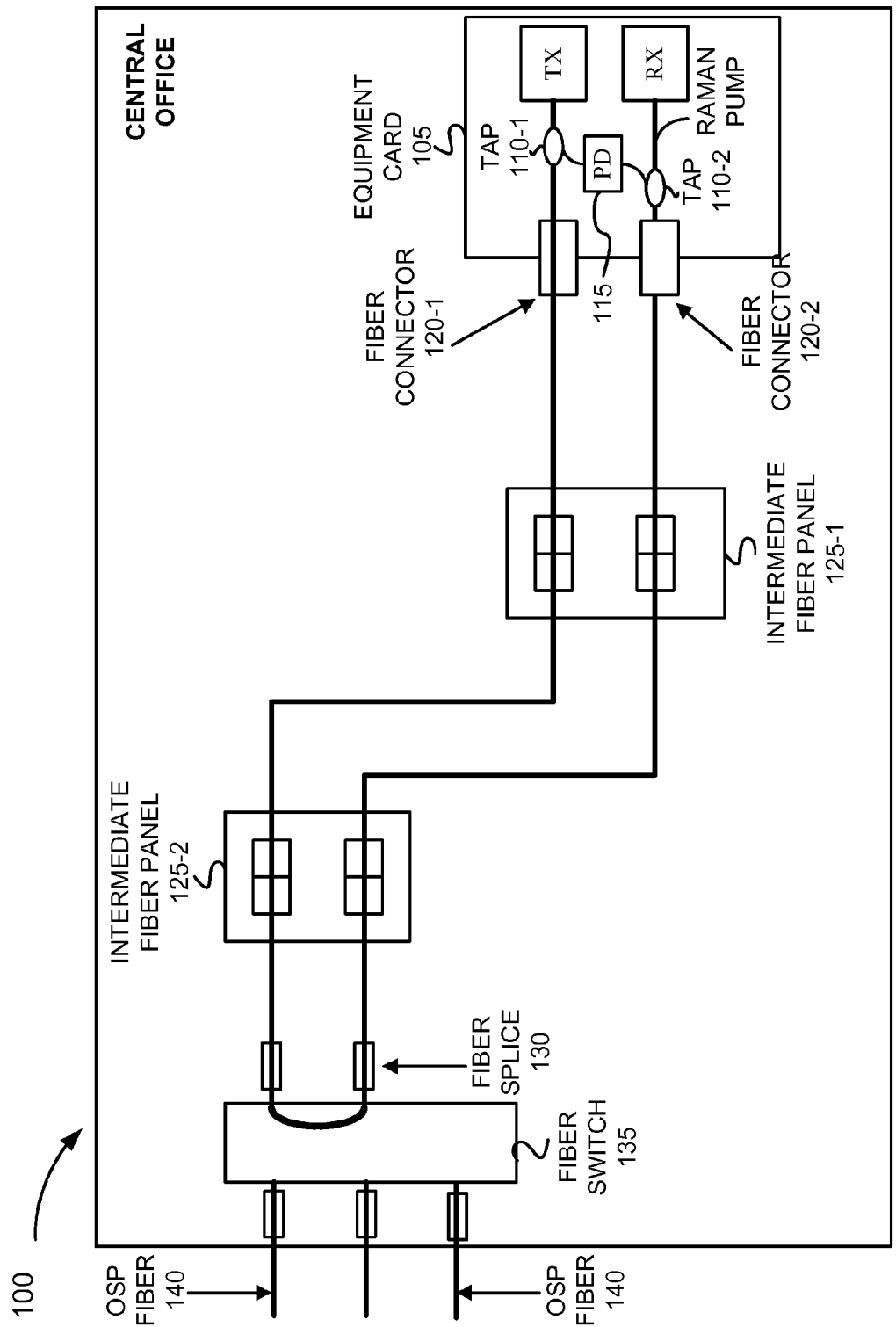
FIG. 1A is a block diagram illustrating an exemplary environment in which power loss may be measured after the optical transmitter and the optical receiver may be connected to an OSP fiber.

FIG. 1A is a block diagram illustrating an exemplary environment 100 in which power loss may be measured after the optical transmitter and the optical receiver may be connected to an OSP fiber. As illustrated in FIG. 1A, exemplary environment 100 may include an optical fiber communication system, such as a central office or some other type of optical fiber communication site or node, that includes an equipment card 105, fiber taps 110-1 and 110-2 (referred to generally as fiber tap 110 or fiber taps 110), a photodetector 115, fiber connectors 120-1 and 120-2 (referred to generally as fiber connector 120 or fiber connectors 120), intermediate fiber panels 125-1 and 125-2 (referred to generally as intermediate fiber panel 125 or intermediate fiber panels 125), a fiber splice 130, a fiber switch 135, and OSP fiber 140.

The number of components and configuration in environment 100 is exemplary and provided for simplicity. In practice, environment 100 may include more, fewer, different, and/or differently arranged components than those illustrated in FIG. 1A.

Equipment card 105 may include a module or some other type of device that includes an optical transmitter and an optical receiver. Equipment card 105 may also include a Raman pump.

Equipment card 105 may include fiber taps 110. As illustrated in FIG. 1A, in an exemplary implementation, fiber taps 110 may be proximate to the optical transmitter and the optical receiver. Fiber taps 110 may provide a passive access to an optical signal without introducing a point of failure. In an exemplary implementation, fiber taps 110 may include a micro-optic tap coupler. Fiber taps 110 may be integrated with optical fiber assemblies. Fiber taps 110 may provide for one or more tap ratios (e.g., 1%, 2%, 3%, etc.).

Photodetector 115 may detect light and optical powers. In an exemplary embodiment, photodetector 115 may correspond to two photodiodes. For example, one photodiode may be used to measure a reference optical signal, which is output from the optical transmitter, and the other photodiode may be used to measure a feedback optical signal looped back to the optical receiver. In other exemplary embodiments, photodetector 115 may correspond to some other form of photodetector (e.g., a metal-semiconductor-metal (MSM) photodetector), etc.). In an exemplary embodiment, photodetector 115 may include a processing system to determine a power loss between fiber taps 110. For example, the processing system may compare the optical power values between the reference optical signal and the feedback optical signal. Photodetector 115 may output an optical power loss value via a port, via a display, via a user interface, etc. In another exemplary implementation, photodetector 115 may not include a processing system. For example, photodetector 115 may output optical power values associated with the reference optical signal and the feedback optical signal. In another exemplary embodiment, the processing system may also determine whether the optical power loss corresponds to an acceptable value. For example, the processing system may compare the optical power loss to an optical power loss threshold value or a range of optical power loss values. In an exemplary implementation, the optical power loss threshold value or range of optical power loss values may be provided by a user (e.g., a network administrator). For example, equipment card 105 and/or photodetector 115 may include a user interface to permit the user to enter optical power loss value(s).

Fiber connector 120 may include a component that terminates an end of an optical fiber. Intermediate fiber panel 125 may include a component that manages optical fiber connections between optical components. For example, intermediate fiber panel 125 may provide for the patching, splicing, and/or storage of optical fibers. Intermediate fiber panel 125 may correspond to an optical distribution frame (e.g., a tray-based distribution frame, a bulkhead style panel, etc.).

Fiber splice 130 may provide an optical connection between optical fibers. As illustrated in FIG. 1A, fiber switch 135 may be spliced in an optical path so that fiber switch 135 is proximate to (e.g., facing) OSP fiber 140. Fiber splice 130 may correspond to a fusion splice in which there may be no connector and no ability for contamination. In this exemplary arrangement, there may be no manual optical fiber connection beyond this point. Fiber switch 135 may include a switching device for optical communication. Fiber switch 135 may be a sealed device in which little or no contamination may result at a connection interface.

OSP fiber 140 may include an optical fiber situated outside an optical fiber communication system, such as a central office or some other type of optical fiber communication site or node. OSP fiber 140 may be used to deliver various services (e.g., phone, television, Internet, etc.) to customers.

Figure 1B:
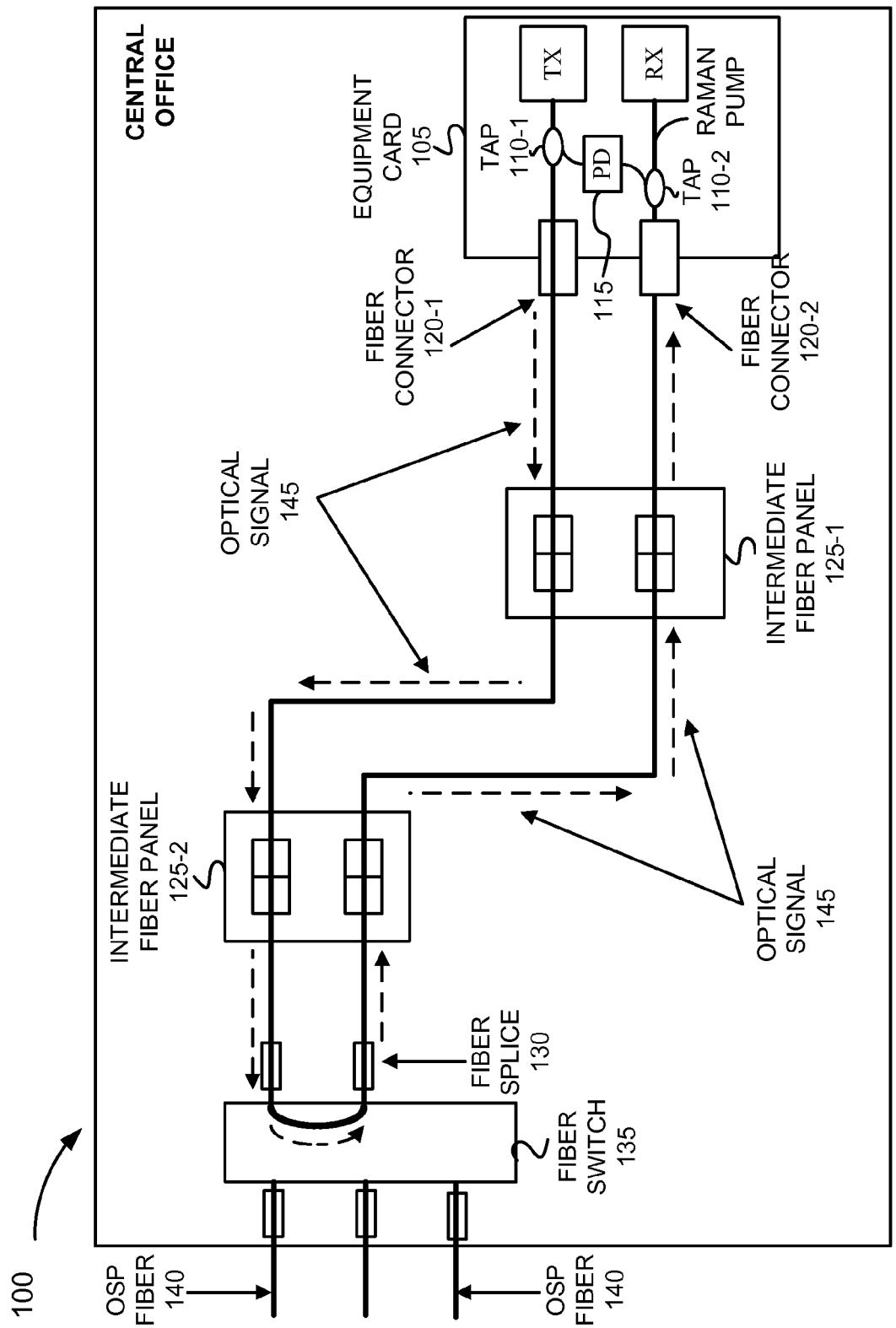
Figure 1D:
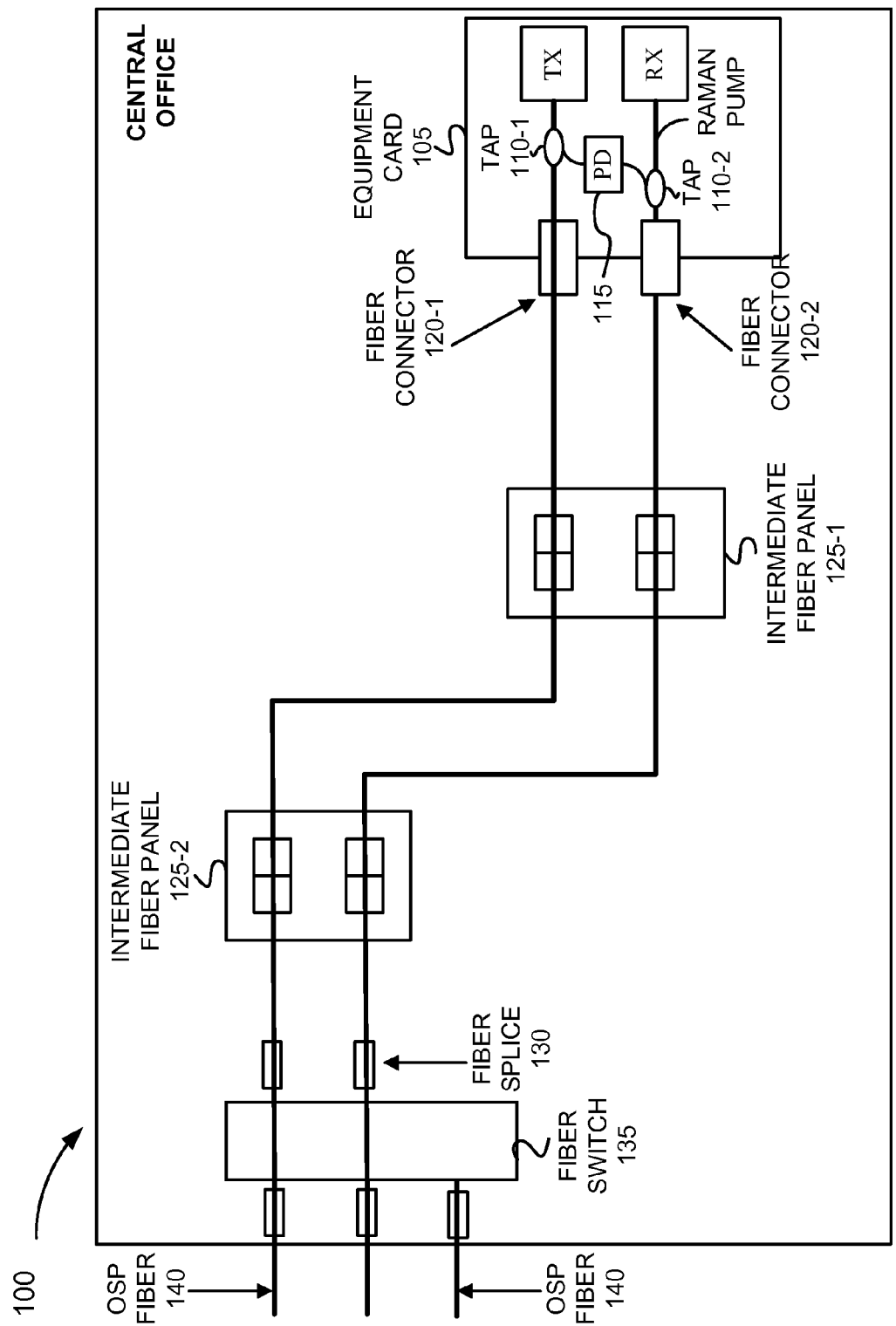

FIGS. 1B-1D are block diagrams illustrating an exemplary process for permitting a power loss to be measured in the exemplary environment depicted in FIG. 1A. Referring to FIG. 1B, the optical transmitter associated with equipment card 105 may be turned on and optical signal 145 may propagate via intermediate panels 125-1 and 125-2 and loop back to the optical receiver via fiber switch 135. During this time, photodetector 115 may detect optical powers at fiber tap 110-1 and fiber tap 110-2.

As illustrated in FIG. 1C, photodetector 115 may provide an output 150. The content of output 150 may vary depending on the embodiment of photodetector 115. As previously described, photodetector 115 may or may not include a processing system. In the instance that photodetector 115 includes the processing system, output 150 may include an optical power loss. For example, photodetector 115 may calculate the optical power loss based on the detected optical powers at fiber taps 110-1 and 110-2. A network administrator may determine whether the optical power loss corresponds to an acceptable value. In other instances, output 150 may indicate whether the optical power loss is an acceptable value based on an optical power loss threshold value or a range of optical power loss values. For example, photodetector 115 may compare the optical power loss to the optical power loss threshold value or a range of optical power loss values.

In the instance that the optical power loss is an acceptable value, fiber switch 135 may be set to a state that permits optical transmission to OSP 140, as illustrated in FIG. 1D. The Raman pump may be turned on. On the other hand, in the instance that the optical power loss is not an acceptable value, the network administrator may check and clean the optical fiber connections in the central office. That is, an unacceptable value of optical power loss may indicate the presence of dirt, dust, oil, or other contaminates.

As a result of the foregoing, total power loss of optical fiber connections within an optical communication system, such as a central office or some other type of optical fiber communication site or node, may be directly measured. This is in contrast to approaches in which power loss is measured at multiple points (e.g., between intermediate fiber panels 125, etc.) in an optical system and comparisons performed. However, in such approaches, contamination may result when disconnecting and connecting optical fibers, connectors, etc., of the optical system. Further, the transmit power of the optical transmitter may vary from one measurement to another. Additionally, or alternatively, damage due to high power in optical fiber or other optical equipment may be prevented or significantly reduced and/or Raman pump amplification may be safely utilized.

Additionally, according the exemplary embodiment illustrated, no extra optical light source may be needed since the optical transmitter may serve as the optical source. Further, fiber taps 110 may have no impact to system performance and may provide accurate power loss measurement. Even further, use of fiber switch 135 may provide flexible loop back path for power loss measurement between the optical transmitter and the optical receiver.

Figure 2:
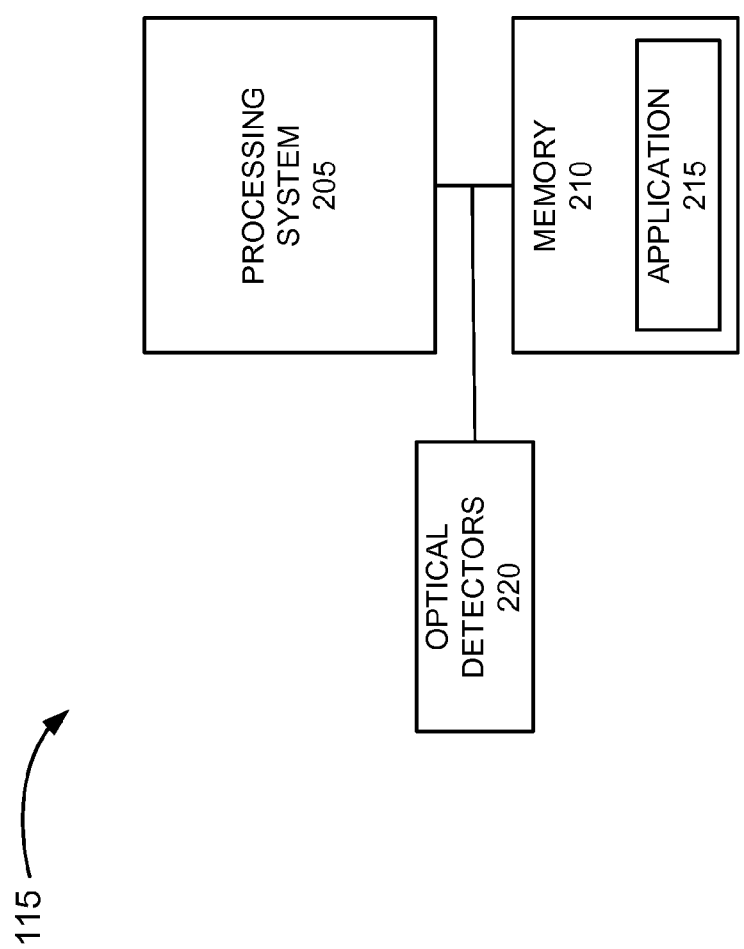
FIG. 2 is a block diagram illustrating exemplary components of an exemplary photodetector.

FIG. 2 is a block diagram illustrating exemplary components of an exemplary photodetector 115. As illustrated, photodetector 115 may include a processing system 205, memory 210 including application 215, and optical detectors 220.

Processing system 205 may include a microprocessor, an application specific integrated circuit (ASIC), a microcontroller, or some other component or hardware (e.g., digital circuitry, analog circuitry, etc.) capable of comparing optical power values and/or determining whether an optical power loss is an acceptable value.

Memory 210 may include one or more memories. For example, memory 210 may include a random access memory (RAM), a dynamic random access memory (DRAM), a read only memory (ROM), a programmable read only memory (PROM), and/or some other type of memory or registers.

Application 215 may include software that may utilize processing system 205 to determine an optical power loss and/or whether the optical power loss is an acceptable value. Application 215 may determine the optical power loss based on signals from optical detectors 220.

Optical detectors 220 may include detectors that detect light. In an exemplary implementation, optical detectors 220 may include photodiodes. In other implementations, optical detectors 220 may include to some other form of photodetector (e.g., an MSM, etc.).

Although, FIG. 2 illustrates exemplary components of photodetector 115, in other implementations, photodetector 115 may include fewer components, additional components, different components, and/or a different arrangement of components than those illustrated in FIG. 2 and described herein. Additionally, it will be appreciated, that photodetector 115 may determine an optical power loss and/or whether the optical power loss is an acceptable value based on a combination of hardware (e.g., processing system 205) and software (e.g., application 215) or based on hardware. Thus, in an exemplary embodiment, photodetector 115 may perform certain operations in response to processing system 205 executing software instructions contained in a computer-readable medium, such as memory 210. The software instructions contained in memory 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 3:
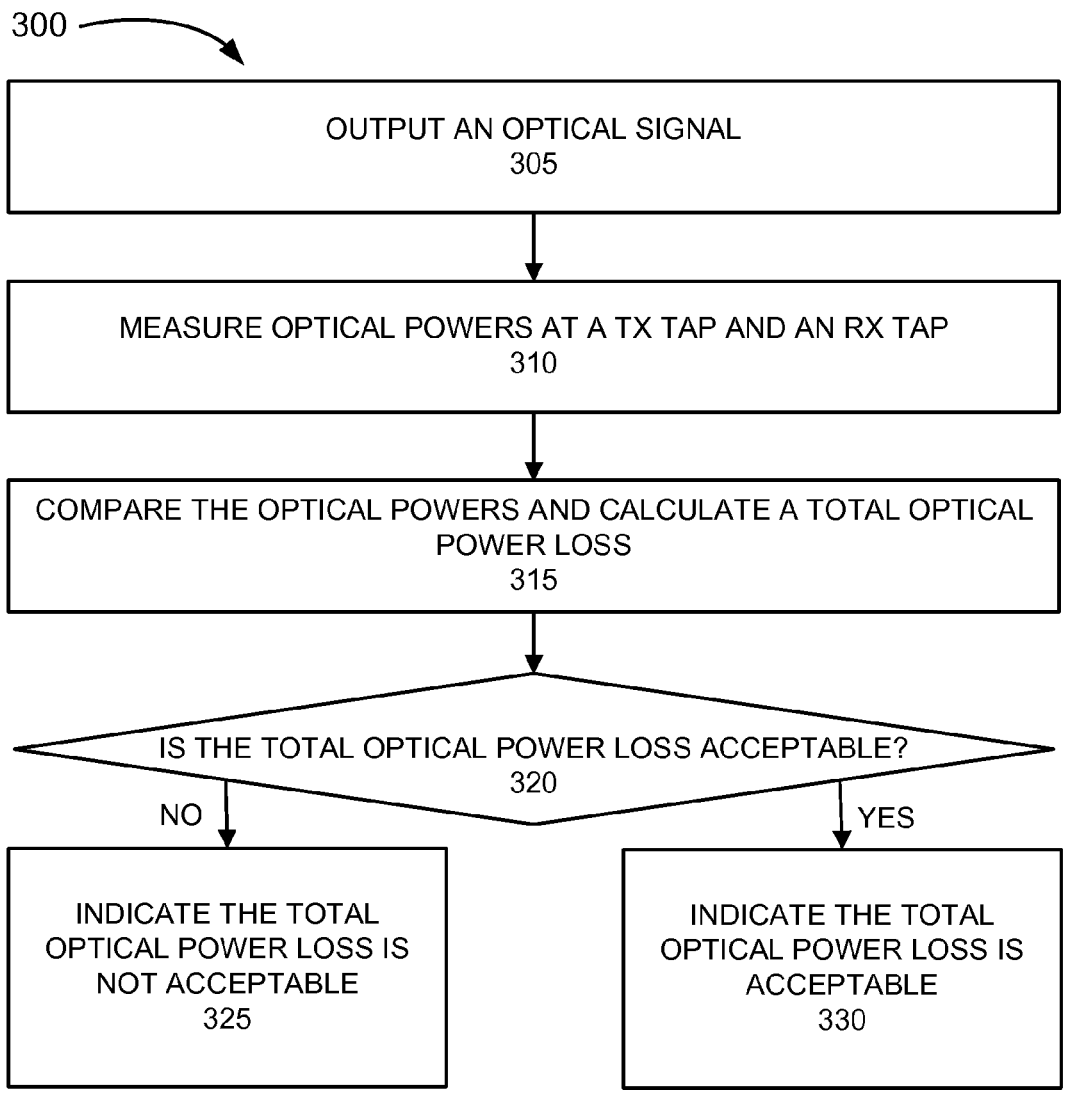
FIG. 3 is a flow diagram illustrating an exemplary process for measuring optical power loss inside an optical communication site and/or node.

FIG. 3 illustrates a flow diagram of an exemplary process 300 for measuring optical power loss inside an optical communication site and/or node. For example, in an exemplary implementation, process 300 may be performed within a central office after optical connections may have been made between the central office and the OSP fiber. Process 300 will be described in reference to figures previously described.

Process 300 may include outputting an optical signal (block 305). For example, an optical transmitter associated with equipment card 105 may output an optical signal. As previously described, the optical signal may be configured to loop back to an optical receiver associated with equipment card 105.

Optical power values at a transmitter tap and a receiver tap may be measured (block 310). For example, taps 110 situated proximate to the optical transmitter and the optical receiver may enable photodetector 115, associated with equipment card 105, to measure optical power values, respectively.

The optical power values may be compared and a total optical power loss may be calculated (block 315). For example, photodetector 115 may compare the measured optical power values and calculate an optical power loss. For example, the optical power loss may correspond to a difference in an optical power measured at tap 110-1 and an optical power measured at tap 110-2.

It may be determined whether the optical power loss is an acceptable value (block 320). For example, in an exemplary implementation, photodetector 115 may compare the optical power loss to an optical threshold power loss value or range of optical power loss values to determine whether the optical power loss is acceptable. In another exemplary implementation, an external processing system may perform the comparing and determining.

If it is determined that the optical power loss is not an acceptable value (block 325-NO), the optical power loss may be indicated. For example, photodetector 115 may output a result of the comparison via a port associated with equipment card 105, via a display, or via some other user interface. The result may include an optical power loss value and/or an indication (e.g., an alert, etc.) that the optical power loss value is not an acceptable value.

If it is determined that the optical power loss is an acceptable value (block 325-YES), the optical power loss value may be indicated. For example, photodetector 115 may output a result of the comparison via a port associated with equipment card 105, via a display, or via some other user interface. The result may include an optical power loss value and/or an indication (e.g., an alert, etc.) that the optical power loss value is an acceptable value.

Although FIG. 3 illustrates the exemplary process 300, in other implementations, additional operations, fewer operations, and/or different operations than those illustrated in FIG. 3 and described, may be performed. Depending on the result of the optical power loss, a user may know whether equipment, optical fiber connections, etc., need to be clean, checked, etc. Additionally, in the instance that the optical power loss is an acceptable value, the user may set the set fiber switch 135 to permit optical transmission to OSP fiber 140. Additionally, the user may safely turn on the Raman pump.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 3, the order of the blocks may be modified in other implementations. Further, non-dependent blocks may be performed in parallel.

It will be apparent that embodiments described herein may be implemented in many different forms of software or firmware in combination with hardware in the implementations illustrated in the figures. The actual software code (executable by hardware) or specialized control hardware used to implement the embodiments does not limit the disclosure of the invention. Thus, the operation and behavior of the devices and/or systems, or a performing of the methods was described without reference to the specific software code—it being understood that software and control hardware can be designed to implement the embodiments based on the description herein.

Further certain features described above may be implemented as "logic" that performs one or more functions. This logic may include hardware, such as one or more processors, one or more microprocessors, one or more ASICs, one or more FPGAs, etc., software, or a combination of hardware and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   outputting, from an optical transmitter of an optical fiber communication site, an optical signal over an optical fiber, via a plurality of manual optical connections within the optical fiber communication site, toward an optical interface with an outside plant fiber connected to the optical fiber communication site;
   causing the optical signal to propagate through an optical fiber path within the optical fiber communication site and to loop back, at a point beyond which none of the manual optical connections are in the optical fiber path to the optical interface with the outside plant fiber, to an optical receiver of the optical fiber communication site;
   measuring optical powers of the optical signal, respectively, based on information provided at taps positioned in the optical fiber path between the optical transmitter and the optical receiver;
   calculating an optical power loss of the optical signal, associated with the optical fiber path within the optical fiber communication site, based on the optical powers measured;
   determining whether the optical power loss corresponds to an acceptable value or an unacceptable value;
   responsive to the optical power loss corresponding to the acceptable value, receiving, at a Raman pump of the optical fiber communication site, user input for activating the Raman pump to provide an amplification of the optical signal; and
   providing, based on the activating of the Raman pump, the amplification of the optical signal for optical transmission of the amplified optical signal via the optical interface to the outside plant fiber.

2. The method of claim 1, further comprising:
connecting the optical fiber communication site to the outside plant fiber before the outputting of the optical signal.

3. The method of claim 1, wherein the causing the optical signal to loop back comprises:
looping back the optical signal to the optical receiver at a fiber switch, of the optical fiber communication site, connected to the optical interface connecting the outside plant fiber and the optical fiber communication site.

4. The method of claim 1, wherein calculating the optical power loss comprises:
determining the optical power loss based a difference between the optical powers measured.

5. The method of claim 1, wherein the determining comprises:
comparing the optical power loss to an optical power loss threshold value or a range of optical power loss values.

6. The method of claim 1, further comprising:
indicating, via a user interface of the optical fiber communication site, that the optical power loss corresponds to the acceptable value or the unacceptable value.

7. The method of claim 1, further comprising:
receiving, by a fiber switch of the optical communication site, a user input to permit the optical transmission of the amplified optical signal to the outside plant fiber connected to the optical fiber communication site.

8. An optical fiber network device implemented at a central office optically coupled to an outside plant fiber, the optical fiber network device comprising:
an optical transmitter to transmit an optical signal over an optical fiber via a plurality of manual optical connections toward an optical coupling with the outside plant fiber;
a sealed optical component, disposed in an optical fiber path of the device, to loop back the optical signal prior to the optical coupling, wherein none of the manual optical connections are disposed in the optical fiber path between the sealed optical component and the optical coupling;
an optical receiver to terminate the optical signal received from the sealed optical component via the optical fiber path within the optical fiber network device;
a first fiber tap, disposed in the optical fiber path to access the optical signal transmitted by the optical transmitter;
a second fiber tap, disposed in the optical fiber path to access the optical signal prior to termination at the optical receiver;
a photodetector coupled to the first fiber tap and the second fiber tap, wherein the photodetector is configured to:
measure a first optical power of the optical signal based on information provided at the first fiber tap;
measure a second optical power of the optical signal based on information provided at the second fiber tap;
determine an optical power loss of the optical signal, associated with the optical fiber path within the optical fiber network device, based on the first optical power and the second optical power;
perform a comparison of the optical power loss to an optical power loss threshold value; and
determine, based on results of the comparison, whether the optical power loss corresponds to an acceptable value or an unacceptable value; and
a Raman pump, disposed in the optical fiber path, to receive user input activating the Raman pump, based on a determination that the optical power loss corresponds to the acceptable value, to amplify the optical signal.

9. The optical fiber network device of claim 8, wherein the photodetector comprises one or more photodiodes.

10. The optical fiber network device of claim 8, wherein the sealed optical component comprises a fiber switch configured to output the amplified optical signal to the outside plant fiber.

11. The optical fiber network device of claim 8, wherein the photodetector is further configured to:
compare the optical power loss to a range of optical power loss values.

12. The optical fiber network device of claim 11, further comprising a user interface configured to:
indicate that the optical power loss corresponds to the acceptable value or the unacceptable value.

13. An optical fiber network system comprising:
an optical transmitter to transmit an optical signal over an optical fiber, via a plurality of manual optical connections, toward an optical connection to outside plant fibers;
an optical receiver to receive the optical signal via an optical fiber path within the optical fiber network system;
a first fiber tap, disposed in the optical fiber path, between the optical transmitter and the optical receiver;
a second fiber tap, disposed in the optical fiber path, between the optical transmitter and the optical receiver;
a photodetector coupled to the first fiber tap and the second fiber tap, wherein the photodetector is configured to perform a measurement of an optical power loss associated with the optical fiber path based on:
a first optical power of the optical signal determined from information obtained at the first fiber tap;
a second optical power of the optical signal determined from information obtained at the second fiber tap;
a processor to determine, based on results of the measurement of the optical power loss, whether the optical power loss corresponds to an acceptable value or an unacceptable value;
a Raman pump to receive user input for activation to amplify the optical signal when the optical power loss corresponds to the acceptable value;
a fiber switch configured to cause the optical signal to:
loop from the optical transmitter to the optical receiver during the measurement of the optical power loss, and
route, based on results of the measurement, from the optical fiber path for output from the optical fiber network system for optical communication via the optical connection to the outside plant fibers, wherein none of the manual optical connections are disposed in the optical fiber path between the fiber switch and the optical connection to the outside plant fibers.

14. The optical fiber network system of claim 13, wherein the optical fiber network system includes a central office.

15. The optical fiber network system of claim 14, wherein the fiber switch connects to the outside plant fibers.

16. The optical fiber network system of claim 14, further comprising:
intermediate fiber panels coupled to the optical transmitter and the optical receiver.

17. The optical fiber network system of claim 14, wherein the photodetector is further configured to:
compare the optical power loss to a range of optical power loss values.

18. The optical fiber network system of claim 17, wherein the photodetector is further configured to:

indicate that the optical power loss corresponds to the acceptable value or the unacceptable value.

\* \* \* \* \*